June 10, 1947. A. G. FORSYTH 2,421,873
GOVERNOR FOR VARIABLE PITCH PROPELLER SYSTEMS
Filed Dec. 17, 1943 7 Sheets-Sheet 1
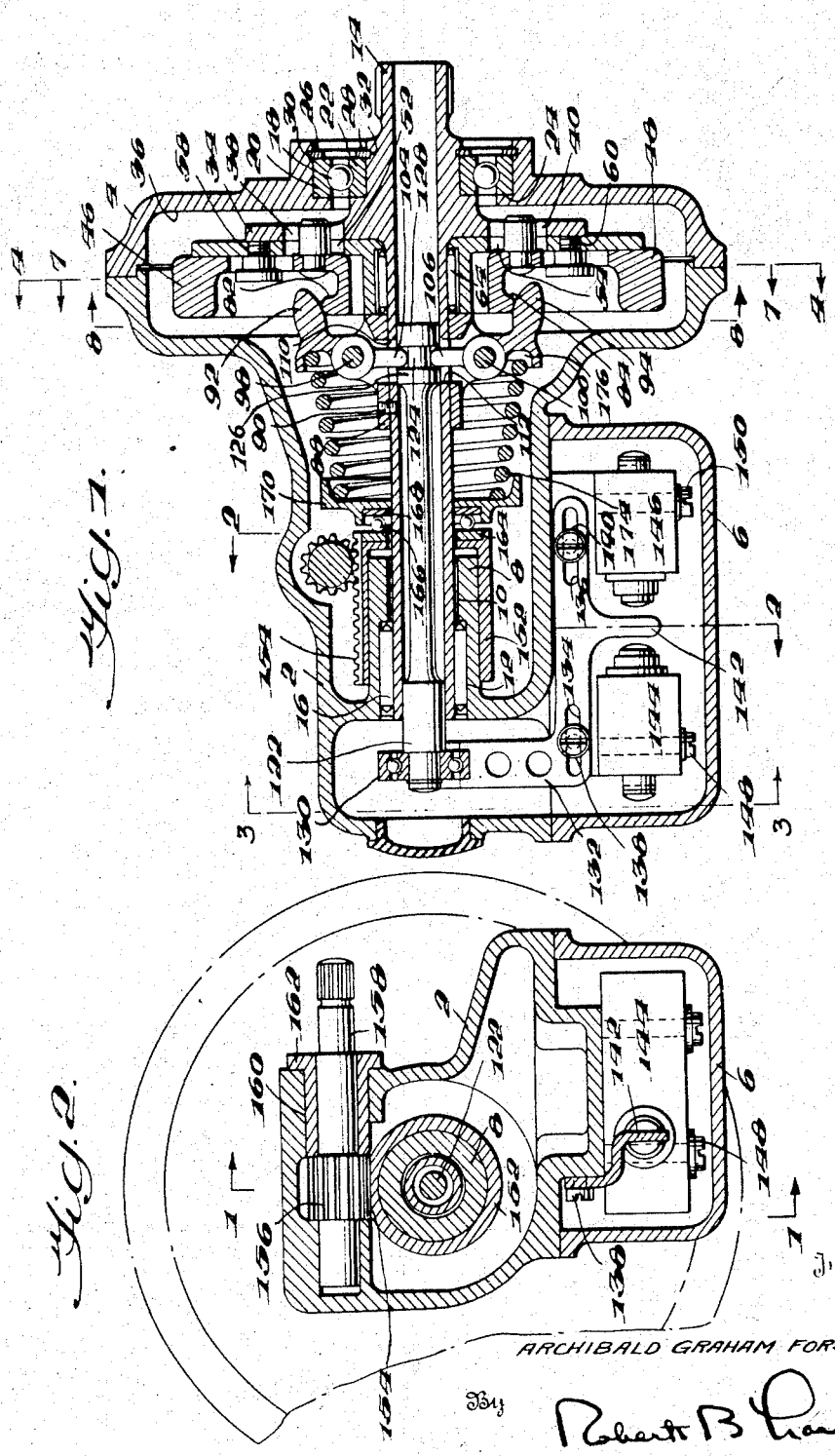
Inventor
ARCHIBALD GRAHAM FORSYTH,
By Robert B. Pearson
Attorney

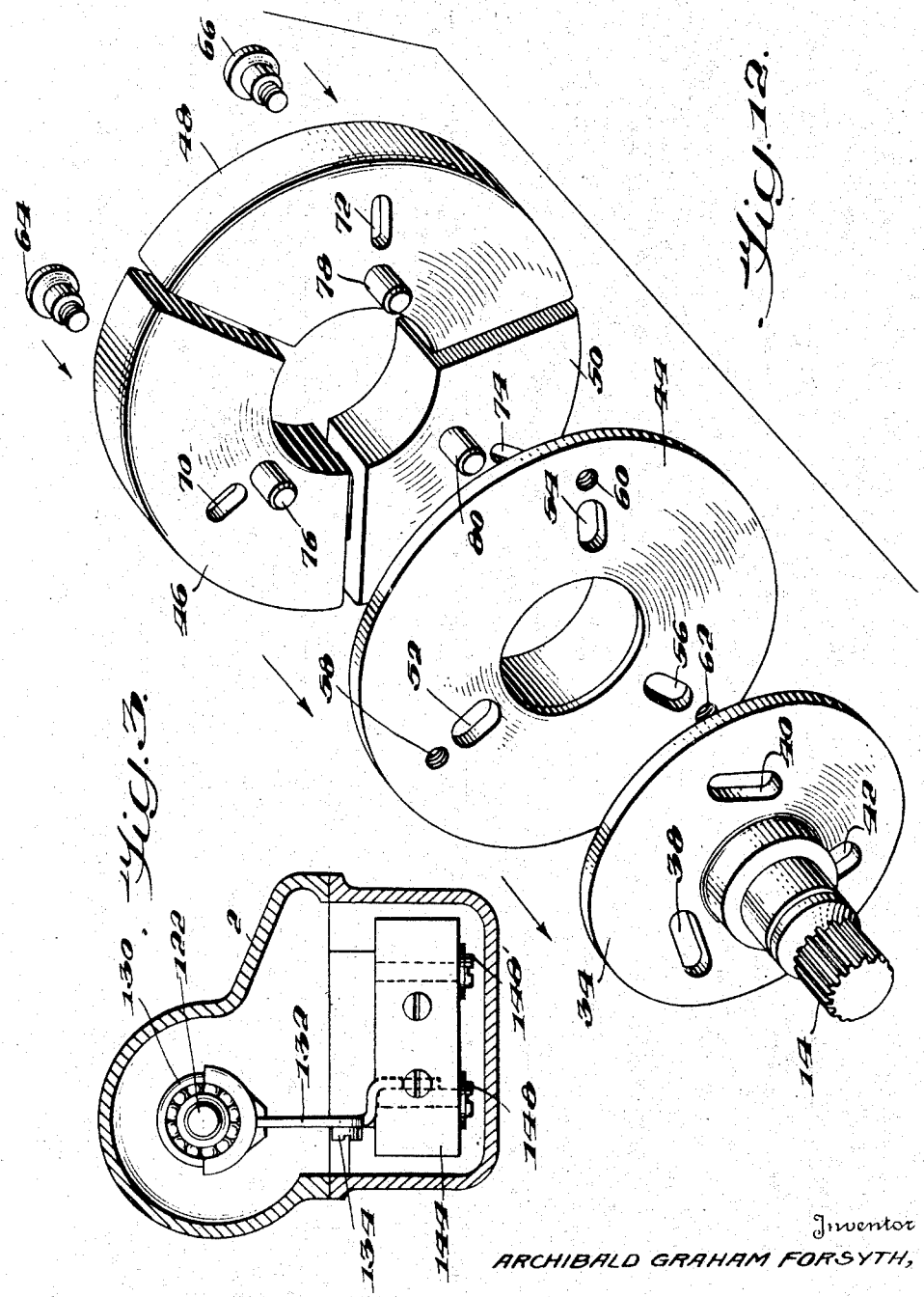

June 10, 1947.  A. G. FORSYTH  2,421,873
GOVERNOR FOR VARIABLE PITCH PROPELLER SYSTEMS
Filed Dec. 17, 1943  7 Sheets-Sheet 3
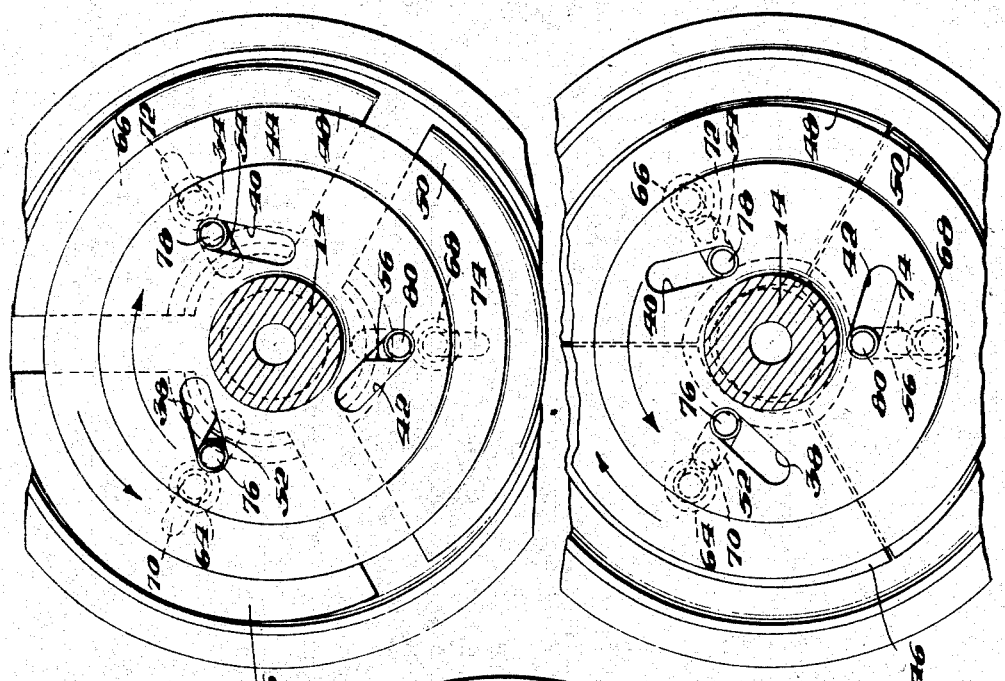
Inventor
ARCHIBALD GRAHAM FORSYTH,
By Robert B. Larson
Attorney June 10, 1947.   A. G. FORSYTH   2,421,873
GOVERNOR FOR VARIABLE PITCH PROPELLER SYSTEMS
Filed Dec. 17, 1943   7 Sheets-Sheet 4

Inventor
ARCHIBALD GRAHAM FORSYTH,
By Robert B. Larson
Attorney

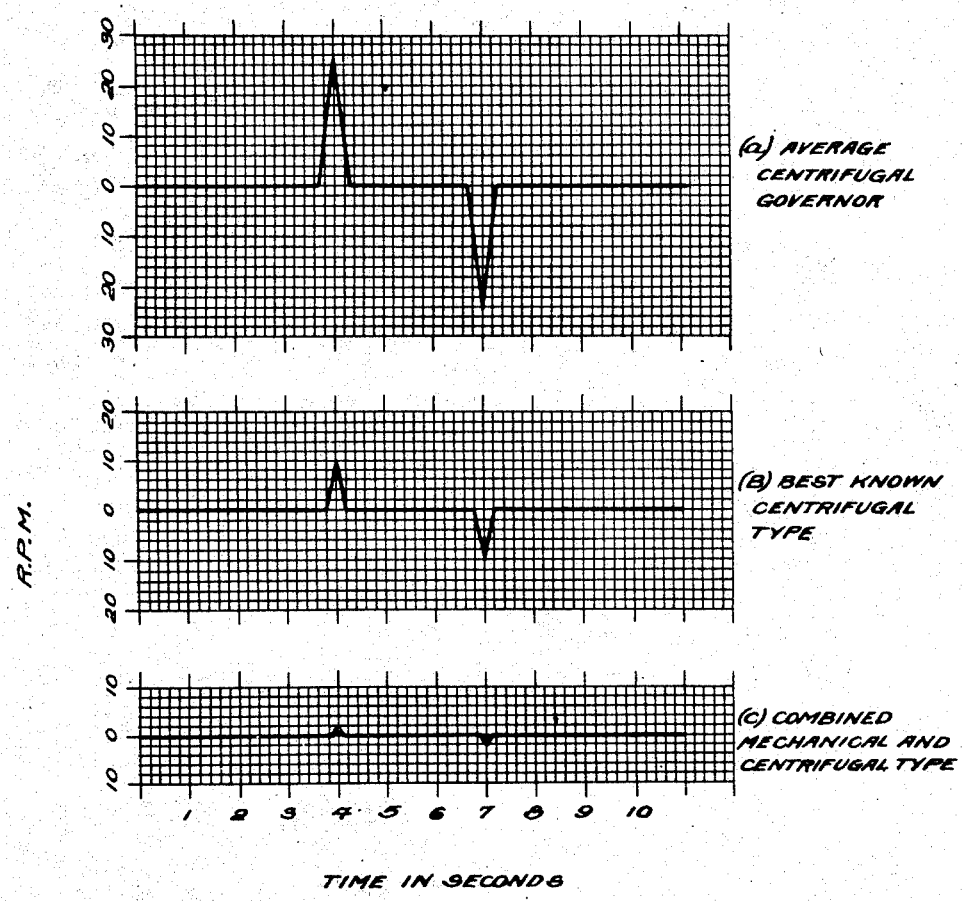

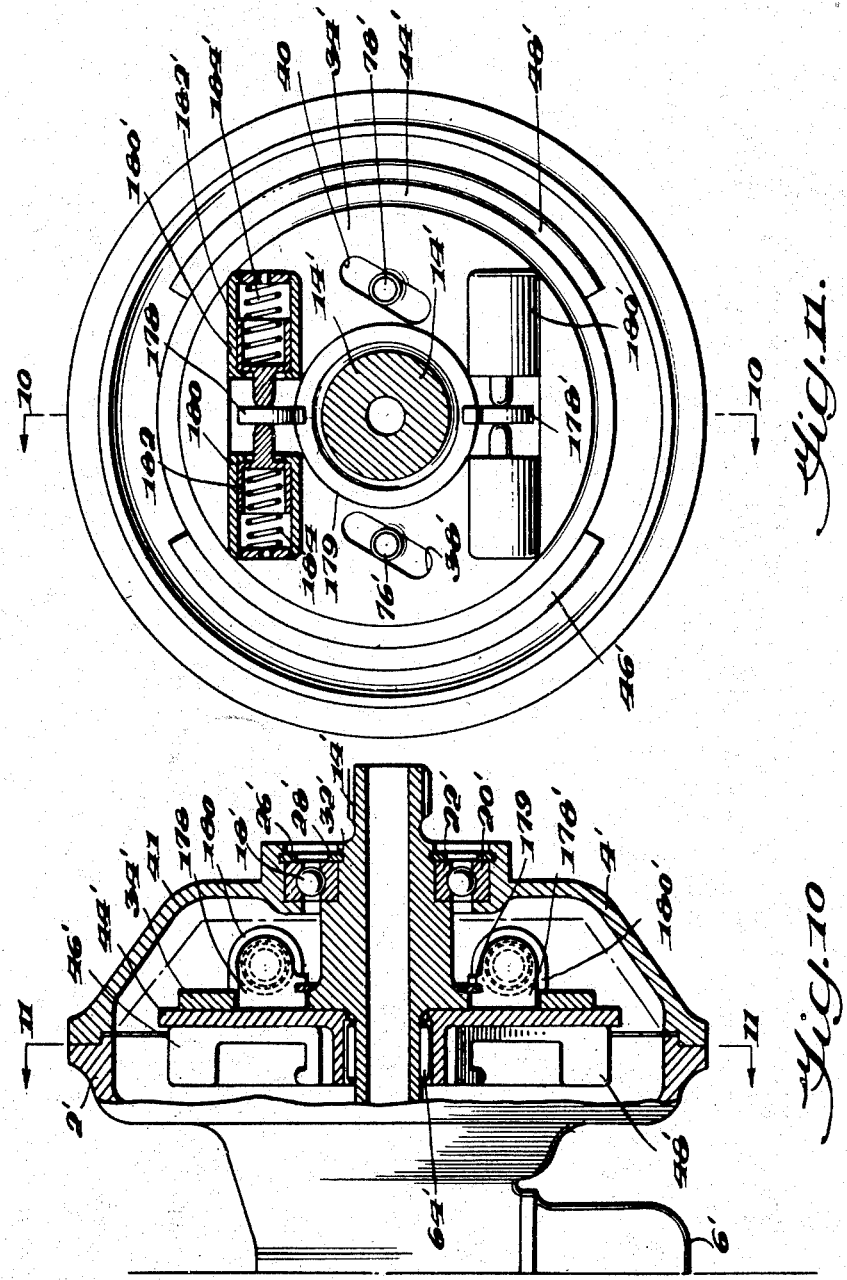

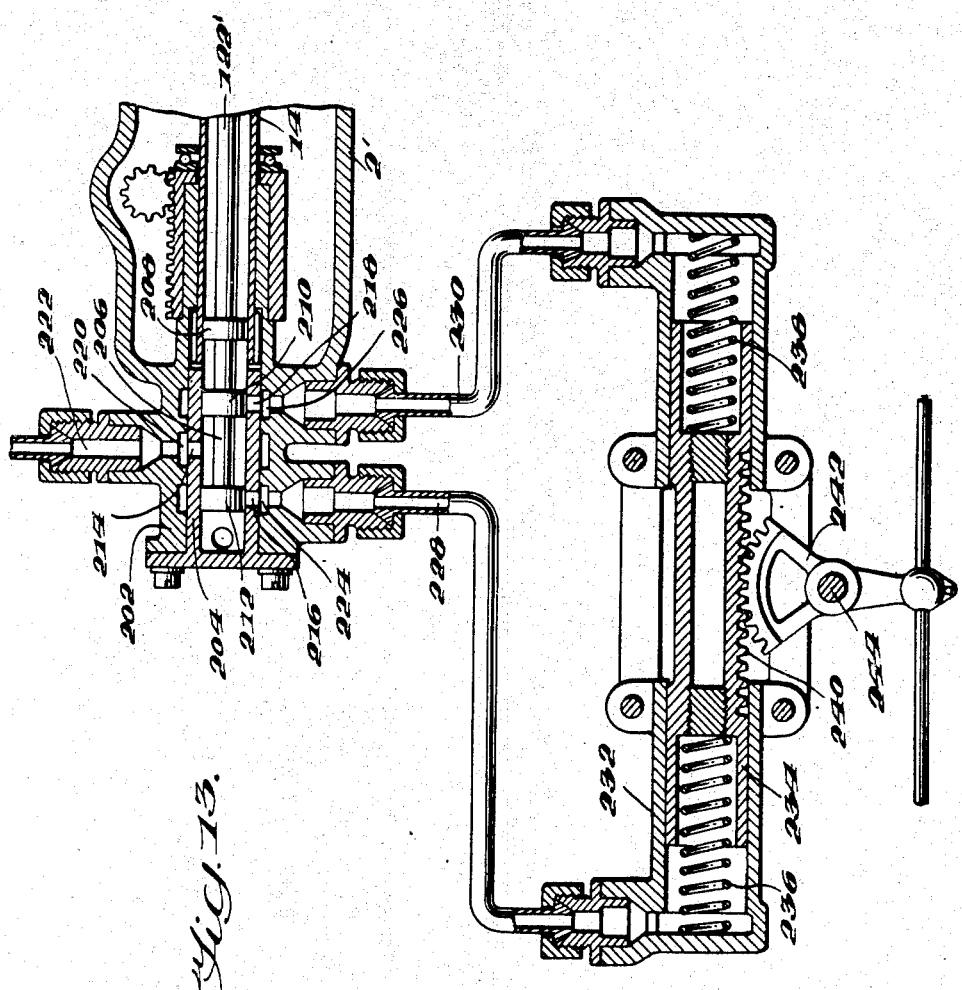

Patented June 10, 1947

2,421,873

UNITED STATES PATENT OFFICE 2,421,873

GOVERNOR FOR VARIABLE PITCH PROPELLER SYSTEMS

Archibald Graham Forsyth, Cheam, England, assignor to The Fairey Aviation Company Limited, Hayes, Middlesex, England Application December 17, 1943, Serial No. 514,730

8 Claims. (Cl. 264—6)

This invention relates to constant speed governors of the type primarily adapted for use in actuating control mechanism of aircraft variable pitch propellers. In my copending application, Serial No. 498,367, filed August 12, 1943, a variable pitch system employing a governor driven by the aircraft engine is illustrated and described. The governor device in accordance with the present invention comprises means which actuates the switches of the pitch changing mechanism instantaneously upon sudden acceleration or deceleration of the aircraft engine.

It is a primary object of this invention to permit a variation in the horsepower of the engine to be effected without changing the R. P. M., that is, while maintaining a constant engine speed.

Centrifugal governors of the types now well known in this art have relied upon the movement of the centrifugal weights which respond to the acceleration and deceleration of the engine to effect a closing and opening of propeller pitch control switches. Obviously, because of the inertia of the weights, an appreciable lag occurs between a sudden increase or decrease in engine speeds and the operation of the switches.

Hence, it is a further object of this invention to provide a centrifugal governor which will instantaneously operate the desired propeller pitch control switch as the speed of the engine is suddenly changed, the operation of the switches being mechanically effected through mechanism which practically instantaneously moves the centrifugal weights into the position they would assume to actuate the switches if the weights were permitted to act under centrifugal force. The instantaneous change of propeller pitch will, of course, serve to maintain the engine speed at the desired number of revolutions per minute.

In the ordinary or normal types of centrifugal governors heretofore employed for this purpose, a variation of as much as 1¾% on either side of a desired normal engine speed frequently occurs. When using the best centrifugal governor heretofore available, a departure of plus or minus ½ of 1% from the desired standard engine speed has been considered very good. Such governors also are difficult to manufacture.

It is one of the objects of this invention to provide a combined mechanical and centrifugal governor device which will actuate switch or other control means upon a plus or minus variation of about 1/26 of 1% of the speed of the aircraft engine.

The mechanical centrifugal governor in accordance with the invention is designed to effect pitch changes under various conditions of change in the engine speed. If, for example, the pilot changes engine speed gradually, the device operates simply as a centrifugal governor, which when the centrifugal force becomes sufficient, actuates the control switch of the system. If, however, a pilot suddenly increases engine speed, the device momentarily operates mechanically, and without initial benefit of centrifugal force, to actuate the switches instantaneously to effect the desired pitch change to return the engine speed to normal and thereby keeping the engine speed constant within plus or minus one revolution per minute. In exceptional circumstances where, for example, the pilot changes the throttle from normal cruising position to full, the mechanical operation will initially and instantaneously actuate the switches to effect propeller pitch changes. The mechanical operation is designed to operate only for a short time but under the instance being referred to, the centrifugal force shortly becomes sufficient to actuate the governor to keep the switches closed for a time sufficient to return the engine speed to normal.

From the foregoing remarks it will be understood that this invention relates to governing means which will effect a change in pitch of the propeller blades so rapidly as to prevent any appreciable change in engine speed to occur, thereby keeping the engine speed, to all intents and purposes, constant under all conditions of throttle operation. Other objects and advantages of this invention will become more apparent from the specification which follows when read in the light of the accompanying drawings in which:

Figure 1 is a longitudinal section taken on the section lines 1—1 of Figure 2, and partly in elevation, the elements being shown in their normal operation positions.

Figure 2 is a section taken on the lines 2—2 of Figure 1.

Figure 3 is a cross-section and partly in elevation taken on the lines 3—3 of Figure 1.

Figure 4 is an elevational view taken on the lines 4—4 of Figure 1, showing the front plate and associated elements in their normal running positions.

Figure 5 is an elevation view taken on the lines 4—4 of Figure 1, showing the front plate and associated elements in their respective positions under a change in speed of the engine in a clockwise direction.

Figure 6 is an elevational view taken on the lines 4—4 of Figure 1 showing the front plate and its associated elements in their respective positions under a change in speed of the engine in a counter-clockwise direction.

Figure 9 is a graphic representation showing the advantages of the present invention over types heretofore employed.

Figure 10 is a cross sectional view taken on the lines 10—10 of Figure 11, showing a modification of this invention.

Figure 11 is an elevational view, partly in cross section, taken on the lines 11—11 of Figure 10, and Figure 12 is a perspective view of the plates and weights shown in Figure 1.

Figure 13 is a partial sectional view showing how the governor may be adapted to control an hydraulically actuated pitch changing mechanism.

Figure 8:
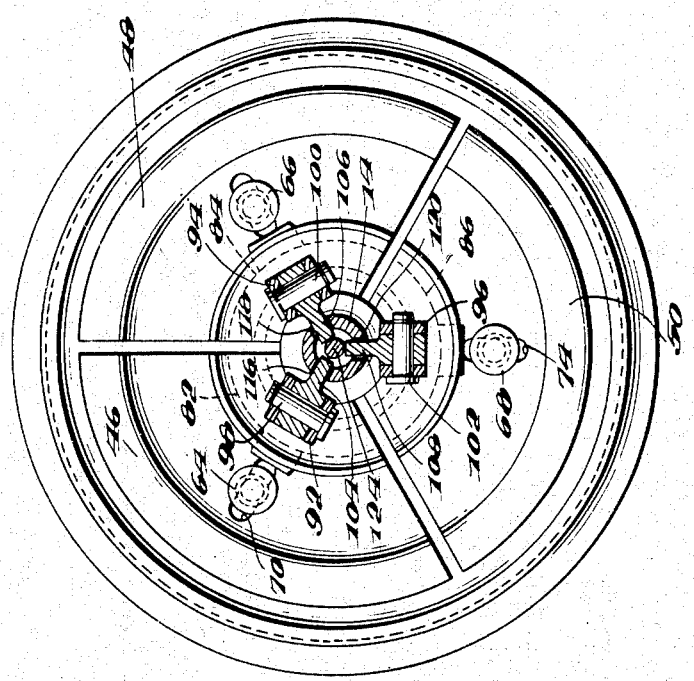
Figure 8 is an elevational view taken on the lines 8—8 of Figure 1.

Referring now more specifically to Figure 1 of the drawings, the reference numeral 2 indicates the main housing for the governor elements and 4 refers to the end closure member for the main housing and is releasably secured thereto in any desired manner. A depending housing 6 is detachably mounted on one end of the main housing 2 and is adapted to enclose certain electrical switching equipment, the nature and function of which will be described in detail below.

The main housing 2 is provided with an internal, laterally extending annular sleeve 8 which is formed with a longitudinally extending boss 10 which communicates with a second longitudinally extending boss 12 of a greater diameter.

One end of a longitudinally extending, substantially hollow shaft 14 is mounted for rotation in the bosses 10 and 12 and rides on the needle bearings 16 disposed in the boss 12.

The other end of the shaft 14 is journaled in the end closure member 4 on the bearings 18 which ride in the races 20 and 22. The bearing races 20 and 22 are prevented from shifting laterally by the annular abutment 24 formed on the end closure member 4 and by the annular lock-ring rings 26 and 28 seated in suitable U-shaped annular recesses 30 and 32, respectively, formed in the end closure member 4 and the shaft 14.

The shaft 14 is provided with a radially extending flange or plate 34, preferably formed integrally therewith, which is disposed adjacent the inner surface 36 of the end closure member 4. The plate 34 is slotted with three non-radial slots 38, 40 and 42, as is clearly seen in Figures 4, 5, 6 and 12.

Figure 7:
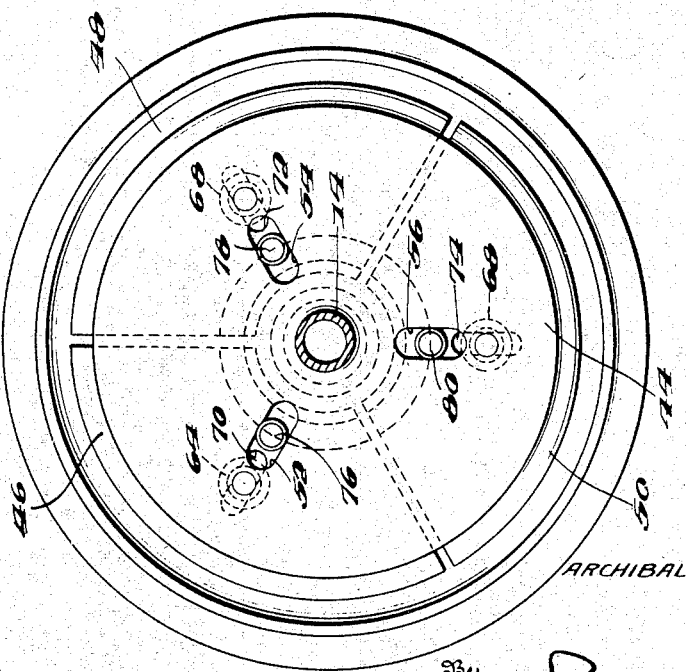
Figure 7 is an elevation taken on the lines 7—7 of Figure 1 and shows the rotatable second plate and its associated elements in normal operation positions.

A second plate 44 is rotatably mounted on the shaft 14 and is positioned intermediate the plate 34 and the three segment shaped weights 46, 48 and 50, as is clearly shown in Figures 1, 8 and 12. The plate 44 (see Figures 7 and 12) is formed with three radially extending slots 52, 54 and 56, and three threaded apertures 58, 60 and 62, and rides on the needle bearings 64 on the shaft 14.

The three segment shaped centrifugal weights 46, 48 and 50 are slidably mounted on the second plate 44 by means of the threaded, headed pins 64, 66 and 68 which extend through the radial slots 70, 72 and 74 and engage the threaded apertures 58, 60 and 62. Each of the segments 46, 48 and 50 are provided with pins 76, 78 and 80, respectively, fixedly mounted thereon as by riveting which project through the radial slots 52, 54 and 56, respectively, of the plate 44 and the non-radial slots 38, 40 and 42, respectively, of the plate 34. These pins are so mounted that their longitudinal axes lie parallel to the longitudinal axis of the shaft 14.

As shown in Figures 1 and 8, the three segmental weights are formed with radially extending shoulders or flanges 82, 84 and 86. A fulcrum bracket 88 is fixedly mounted on the shaft 14 by the pin 90 so as to rotate therewith, and is adapted to carry three rocker arms 92, 94 and 96, rotatably mounted on their respective pin 98, 100 and 102. (See Figures 1 and 8.) Each rocker arm is provided with a depending finger 104, 106 and 108, respectively, each of which projects through their respective slots 110, 112 and 114 formed in the fulcrum bracket 88, and also the slots 116, 118 and 120 positioned in the shaft 14 and which are in coaxial alignment with their respective slots 110, 112 or 114.

A shaft 122 is slidably and rotatably mounted in the hollow shaft 14 and is coaxial therewith. Adjacent one end of the shaft 122, the diameter thereof is substantially reduced to form the neck portion 124 and the shoulders 126 and 128. As is seen in Figures 1 and 8, the fingers 104, 106 and 108 project downwardly through the slots formed in the fulcrum bracket 88 and the shaft 14 and are disposed between the shoulders 126, 128 of the shaft 122. The other end of the shaft 122 projects beyond the end of the shaft 14 and is journaled in a suitable bearing 130 on a bracket 132. The bracket 132 is slotted as at 134, 136 and is slidably mounted on the main housing 2 by the bolts 138, 140. From Figures 1 and 2 it will be seen that the bracket 132 is provided with a depending switch arm 142 adapted to engage and operate the fine and coarse pitch switches 144, 146, in a manner to be explained in detail below. The switches 144, 146 are secured to main housing 2 as by bolts 148 and 150.

A laterally extending sleeve 152 is slidably mounted on the sleeve 8 and is provided on its exterior surface with a gear rack 154 adapted to engage the gear teeth 156 cut on the shaft 158 which extends through an aperture 160 on the housing 2. The shaft is properly supported in the aperture 160 by a bushing 162.

One end of the sleeve 152 is provided with an annular bearing race 164 adapted to cooperate with the ball bearings 166 and a second bearing race 168 disposed on an annular plate 170 mounted concentrically on the shaft 14 and provided with a peripheral flange formed integrally therewith.

A spring 174 under compression is positioned to abut against the plate 170 and a suitable groove 176 formed in the fulcrum bracket 88.

Having described the elements of this governor in detail and their respective association, the function of the device becomes clear.

The free end of the shaft 14 is coupled in any desired manner to the drive shaft of an airplane engine. Now, if it be assumed that it is desired to operate the engine at a constant speed of 2000 R. P. M. under normal operating conditions, the tension of the spring 174 is adjusted accordingly by increasing or decreasing the tension thereof by rotating the shaft 158 which is geared to the sleeve 152, thereby shifting the sleeve 152 laterally on the sleeve 8, thereby increasing or decreasing the tension of the spring 174.

At 2000 R. P. M., the weights 46, 48 and 50 will have moved radially outwardly to such a position as to move the pins 76, 78 and 80 midway between the slots 38, 40 and 42 of the plate 34, and also midway between the ends of the slots 52, 54 and 56 of the plate 44. The weights so disposed are moved so that the ends of the slots 70, 72 and 74 are equidistant from the pins 64, 66 and 68 (see Figure 4). The elements are now situated in their normal running positions.

Now, if it be assumed that it is desired to suddenly increase the horsepower of the engine while still maintaining a constant running speed of 2000 R. P. M., the sudden increase in the torque of the shaft 14 due to the sudden opening of the throttle will rotate the plate 34 in such a manner as to force the pins 76, 78 and 80 upwards to the ends of the slots 38, 40 and 42. The movement of the pins 76, 78 and 80 causes, simultaneously, an upward displacement of these pins in the slots 52, 54 and 56 in the plate 44. The upward movement of the pins 76, 78 and 80 force the lower ends of the slots 70, 72 and 74 against the pins 64, 66 and 68, which, as shown in Figure 5, will then occupy the lowermost end of their respective slots. The weights are then in their outermost position. The movement of the weights radially outwardly produces a pivoting action of the rocker arms 92, 94 and 96, this movement producing an inward movement of the fingers 104, 106 and 108 to such an extent that they engage the abutment 128 to shift the shaft 122 laterally to the right as shown in Figure 1. This movement of the shaft 122 takes place against the tension of the spring 174, and in so moving, causes the depending projection 142 formed on the bracket 132 to engage the coarse pitch switch 146. The closing of this switch immediately causes the pitch of the propeller to change toward coarse pitch, thereby permitting the engine speed to remain constant at the desired 2000 R. P. M. while instantaneously changing and/or increasing the horsepower delivered by the engine.

On the other hand, if it be assumed that while running under normal conditions of 2000 R. P. M. it is desired to suddenly decrease the horsepower delivered by the engine while still maintaining the speed of the engine at 2000 R. P. M., the sudden change in torque on the shaft 14 will cause the pins 76, 78 and 80 to ride down the non-radial slots 38, 40 and 42. From the construction of this device, reference being made to Figures 1 and 6, the sudden change in position of the pins 76, 78 and 80 causes these pins to be disposed in the lower ends of the slots 52, 54 and 56 of the plate 44. The downward movement of these pins which are rigidly secured to their respective weights will cause the weights to be moved inwardly to the position shown in Figure 6 wherein the pins 64, 66 and 68 now occupy the uppermost ends of their respective slots 70, 72 and 74.

Under each of these abnormal conditions, it will be understood that the initial force which moves the pins 76, 78 and 80 to either one of the ends of the slots 38, 40 and 42 will gradually decrease as the inertia of the weights increases or decreases depending upon the acceleration of the motor. This inertia continues in effect for a period of time which is sufficiently long to permit a change in the pitch of the propeller blades which will of course act to absorb the change in the horsepower being developed by the engine. The absorption of this horsepower due to the change of propeller pitch will prevent the speed of the motor from varying from the desired normal as much as one (1) R. P. M.

In each of the cases described above, the centrifugal weights have been moved either radially outwardly or radially inwardly by mechanical means to occupy positions they would normally take if permitted to move under the action of centrifugal force, depending upon the amount of acceleration or deceleration of the engine. When the desired change of pitch has been effected in accordance with the increase or decrease in horsepower to be developed by the engine, the weights will instantaneously be returned to their normal positions and the pins will again be disposed intermediate the ends of their respective slots.

During normal operation of this governor wherein the throttle is advanced or retracted slowly, any variations in the speed of the engine will be controlled purely by the centrifugal action of the weights actuating, if necessary, either of the switches 144 or 146 if the speed of the engine is varied in such a degree as to depart from the desired normal of a plus or minus 10 R. P. M.

Obviously, as soon as the abnormal conditions illustrated in Figures 5 and 6 have been overcome, the centrifugal force developed by the moving weights 46, 48 and 50 will move the weights radially upwardly or downwardly with respect to the shaft 14 until all of the several elements of this governing device reach their normal positions as is shown in Figures 1 and 4.

Figures 10 and 11 illustrate a modification of this governing device. From Figure 10 it is seen that a radially outwardly extending flange or plate 34' is formed integrally with the shaft 14'. A second plate 44' is mounted for rotation on the shaft 14' and rides on the needle bearings 64'. This second plate 44' is provided with the two weights 46' and 48' which are secured in the manner previously described.

Plate 44' is provided with a pair of oppositely disposed radial slots and the plate 34' is provided with a pair of non-radial slots 38' and 40'. The weights 46' and 48' are provided with a pair of laterally extending pins 76', 78' which are rigidly secured to their respective weights. The pins 76', 78' project through the above-mentioned slots in the manner described above with reference to the original disclosure.

A pair of projecting fingers 178 and 178' are rigidly secured to the flange 44'. These fingers are adapted to project through a slot formed in the plate 34' and are positioned intermediate the plungers 182 and 182' slidably mounted in the casings 180 and 180' which in turn are secured to the plate 34'.

In all other respects the construction of this device is similar to the device described above and the reference numerals applied to the drawings on Figures 10 and 11 relating to similar parts found in the drawings from Figures 1 to 9, inclusive, are distinguished therefrom by the prime marks.

The modification illustrated in Figures 10 and 11 is designed to prevent an actuation of the switches 144, 146 upon slight fluctuations of the engine speed while operating under normal conditions. It is possible, of course, that under normal operating conditions such as wherein the throttle is maintained in one position or wherein the pilot may advance or retard the throttle by small degrees, that the switches 144, 146 would be alternately operated. Operation of these switches under the above-described conditions would depend upon the spacing of the switches from the movable switch arm 142. If the spacing is quite small, the alternative operation of these switches would produce changes in the propeller pitch quite rapidly and in so doing would produce considerable hunt. In this modified device slight changes in the position of the plate 34' with respect to the plate 44' are resisted by the plungers 182 and 182' and their cooperating springs 184 and 184'. In all other respects the function of this device is identical to that described above.

In Figure 9 is illustrated, graphically, the advantages of this combined mechanical and centrifugal type of governor. The chart indicated by the reference letter A shows the fluctuation in R. P. M. of the average centrifugal type governor, while the variations in R. P. M. herein illustrated depart from the normally desired operating speed by 25 R. P. M. Many other average type centrifugal governors now in widespread use will vary as much as 50 R. P. M.

In the chart indicated at B, it will be seen that the departure from the desired normal operating speed with the best known centrifugal type governor will amount to approximately 10 R. P. M., a considerable improvement over the average centrifugal governor. However, in all of these better types of centrifugal governors considerable difficulty is experienced in the manufacture thereof and their widespread use is practically prohibited by the expense of manufacture.

In the chart illustrated in Figure 9 at C, the departure from the desired operating engine speed is shown to be 1/20 of 1% or less. For all practical purposes, this per cent of deviation from the desired normal can be considered to be zero, and under actual conditions, the curve shown in the diagram C can be made to be practically linear.

In Figure 13 there is illustrated an arrangement by which the governor heretofore described may be employed with a pitch changing mechanism which is hydraulically controlled.

In this figure the main portion of the governor has been broken away but the portion not shown is identical to that illustrated in Figure 1. As shown in Figure 13, the main housing 2' is extended toward the left and the extended portion 202 is provided with a bore in which is fitted a sleeve 204, the inner diameter of which is equal to the inner diameter of the hollow shaft 14 and is coaxial therewith.

The shaft 122' in this instance is provided with an extension 206 having three enlarged portions 208, 210 and 212 of a diameter substantially equal to the inner diameter of the sleeve 204 and the hollow shaft 14. Portion 208 rides in the hollow shaft 14 while portions 210, 212, which comprise valve members, ride in the sleeve 204.

The sleeve 204 is provided with an upper opening 214 and two lower openings 216, 218. The upper opening communicates with an aligned opening 220 in the extended portion 202 of the main housing, which opening 220 is in the passageway 222 leading to a source of fluid under pressure.

The extended portion 202 of the main housing also has two passageways 224 and 226 connecting respectively with the tubes 228 and 230.

The reference numeral 232 represents a two part cylinder, which receives a piston member 234 which is normally urged to the central position shown by the coil springs 236, 238. Tube 228 connects with the left end of the cylinder and tube 230 with the right end.

The central part of the piston member is provided with a rack portion 240 which is engaged by a segment pinion 242 mounted on a shaft 244.

Rocking movement of shaft 244 is adapted to effect a pitch changing mechanism. A somewhat similar arrangement is shown in Figures 20, 21 and 22 of my copending application S. N. 498,367, filed August 12, 1943, in which the rack is moved by solenoids and not hydraulically.

The arrangement shown in Figure 13 operates in the following manner: In the position shown, during normal operation, fluid under pressure enters the opening 214 but cannot pass to either of the lower openings 216, 218 which are blocked by the enlarged portions 210, 212 of the shaft 122.

However, upon sudden acceleration or deceleration of the engine, shaft 122 will move either to the right or to the left. Movement to the right permits fluid under pressure to flow either through openings 218, 226 or tube 230 to the right end of cylinder 232 moving the piston member 234 to the left. Movement of shaft 122 to the left permits fluid under pressure to flow through openings 216, 224, tube 228, to the left end of cylinder 232 thus moving the piston member 234 to the right. As described, movement of the piston member 234 in either direction will, through the rack portion 240 and segment pinion 242 correspondingly effect a pitch change.

This hydraulic arrangement possesses many advantages.

In addition to the foregoing, the advantages of this combined mechanical and centrifugal type of governor is easy and inexpensive to manufacture and permits of easy maintenance.

It should be obvious that the invention described herein will have manifold uses. For example, it can be used as a governor for any type of engine, and in fact, any means requiring a control related to the speed of a rotatable element where instantaneous control is desired.

A governor according to the present invention may be housed in the main casing of the pitch changing apparatus such as shown, for example, in Figure 10 of my copending application Serial No. 498,367, filed August 12, 1943, in which instance the member 34 (Fig. 1 of the present application) may be extended to carry gear teeth for engagement with the gear teeth on any of the pinions of Figure 11 of said copending case.

Having described this invention in considerable detail, it is to be understood that this invention is not to be limited to the specific structures shown and only to the extent of the scope of the following claims.

I claim:

1. An instantaneously operable speed responsive device comprising a rotatable hollow driven shaft, a plate fixed to said shaft for rotation therewith, said plate being provided with non-radial slots, a plurality of weights having pins engaging said slots, all of said weights being radially movable in one and the same plane by centrifugal force in response to gradual changes in the rate of rotation of said shaft and being similarly movable by the cam action of said slots on said pins on sudden changes in the rate of rotation of said shaft, a controlled member within said shaft and having a circumferential groove therein, and means operated by said weights and engaging said groove for moving said controlled member axially in response to changes in the radial position of said weights.

2. A speed responsive device as set forth in claim 1 in which said weights are segment shaped and are formed with interior axially extending flanges, and pivoted arms are provided having one end of each arm in contact with the flange on one of said weights and the other end in operating contact with said groove in said controlled member.

3. A centrifugal instantaneously operable speed responsive device for variable pitch propeller systems comprising a rotatable hollow shaft adapted to be driven by the aircraft engine, a plate fixed to said shaft for rotation therewith and having a plurality of non-radial slots therein, an interiorly flanged disc rotatably mounted on said shaft adjacent said plate and having a plurality of radial slots and threaded screwholes therein, a plurality of segment shaped interiorly flanged weights mounted about said shaft and adjacent said disc, each of said weights having a radial slot therein, a plurality of pins, one of said pins projecting from the face of each of said weights and extending through one of the slots in said disc and into one of the slots in said plate, a plurality of threaded and headed pins, each of said last mentioned pins extending through a slot in one of said weights into threaded engagement with one of said screwholes in said disc to secure said weights to said disc, a controlled member mounted for axial movement within said hollow shaft, a plurality of pivoted arms, each arm having one of its ends in contact with the interior flange on one of said weights and its other end in contact with said controlled member to move said member axially on radial movement of said weights, and mounting means for said arms, said mounting means being fixed to said shaft and having a portion adjacent the interior flange on said disc to maintain said disc and thereby said weights in operative proximity to said plate.

4. A centrifugal instantaneously operable speed responsive device for variable pitch propeller systems comprising a rotatable hollow shaft adapted to be driven by the aircraft engine, a plate fixed to said shaft for rotation therewith, a plurality of non-radial slots in said plate, an interiorly flanged disc rotatably mounted on said shaft adjacent said plate and having a plurality of radial slots and threaded screwholes therein, a plurality of segment shaped interiorly flanged weights mounted about said shaft and adjacent said disc, each of said weights having a radial slot therein, a plurality of pins, one of said pins projecting from the face of each of said weights and extending through one of the slots in said disc and into one of the slots in said plate, a plurality of threaded and headed pins, each of said last-mentioned pins extending through a slot in one of said weights into threaded engagement with one of said screwholes in said disc to secure said weights to said disc, a controlled member mounted for axial movement within said hollow shaft, a plurality of pivoted arms, each arm having one of its ends in contact with the interior flange on one of said weights and its other end in contact with said controlled member to move said member axially on radial movement of said weights, a casing enclosing the above-enumerated elements and having an integral hollow tubular sleeve serving as a journal for one end of said shaft, a second sleeve mounted on said integral sleeve, and a helical spring mounted about said shaft between said pivoted arms and said second sleeve yieldably to urge said weights radially inwardly.

5. A centrifugal instantaneously operable speed responsive device for variable pitch propeller systems comprising a rotatable hollow shaft adapted to be driven by the aircraft engine, a plate fixed to said shaft for rotation therewith, a plurality of non-radial slots in said plate, an interiorly flanged disc rotatably mounted on said shaft adjacent said plate and having a plurality of radial slots and threaded screwholes therein, a plurality of segment shaped interiorly flanged weights mounted about said shaft and adjacent said disc, each of said weights having a radial slot therein, a plurality of pins, one of said pins projecting from the face of each of said weights and extending through one of the slots in said disc and into one of the slots in said plate, a plurality of threaded and headed pins, each of said last-mentioned pins extending through a slot in one of said weights into threaded engagement with one of said screwholes in said disc to secure said weights to said disc, a controlled member mounted for axial movement within said hollow shaft, a plurality of pivoted arms, each arm having one of its ends in contact with the interior flange on one of said weights and its other end in contact with said controlled member to move said member axially on radial movement of said weights, a second sleeve slidably mounted on said integral sleeve, a helical spring mounted about said shaft between said pivoted arms and said second sleeve and serving yieldably to urge said weights radially inwardly, and means for adjusting the axial position of said second sleeve to adjust the tension of said spring.

6. A speed responsive device as set forth in claim 5 in which said last mentioned means comprises a rack and pinion.

7. A device as set forth in claim 4 in which a spring pressure plate is mounted about said shaft in engagement with one end of said spring, the other end of the spring engaging said arms, and ball bearing means are provided between said pressure plate and said second sleeve.

8. A device as set forth in claim 1 in which resilient means are provided on said plate for resiliently opposing relative rotary movement between said plate and said weights, thereby to secure against hunting movements of said controlled member responsive to slight changes in the speed of rotation of said shaft.

ARCHIBALD GRAHAM FORSYTH.

REFERENCES CITED

The following references are of record in the file of this patent:

UNITED STATES PATENTS

| Number | Name | Date |
| --- | --- | --- |
| 435,923 | Dennis | Sept. 9, 1890 |
| 742,842 | Dodge | Nov. 3, 1903 |
| 924,234 | Johansen | June 8, 1909 |
| 1,029,026 | Newman | June 11, 1912 |
| 1,265,883 | Church | May 14, 1918 |
| 1,606,138 | Barber | Nov. 9, 1920 |
| 1,670,035 | Harrison | May 15, 1928 |

FOREIGN PATENTS

| Number | Country | Date |
| --- | --- | --- |
| 126,918 | Germany | Jan. 20, 1902 |
| 127,485 | Germany | Jan. 18, 1902 |